United States Patent [19]

Kanayama

[11] Patent Number: 4,875,172

[45] Date of Patent: Oct. 17, 1989

[54] LOCOMOTION-COMMAND METHOD FOR MOBILE ROBOTS

[75] Inventor: Yutaka Kanayama, Nijhari, Japan

[73] Assignees: Yutaka Kanayama, Ibaragi; Glory Kogyo Kabushiki Kaisha, Hyogo, both of Japan

[21] Appl. No.: 235,710

[22] Filed: Aug. 19, 1988

Related U.S. Application Data

[63] Continuation of Ser. No. 91,362, Aug. 28, 1987, abandoned, which is a continuation of Ser. No. 715,002, Mar. 22, 1985, abandoned.

[30] Foreign Application Priority Data

Sep. 28, 1984 [JP] Japan ................................ 59-203326

[51] Int. Cl.[4] .............................................. G06F 15/50
[52] U.S. Cl. ................................ 364/513; 364/424.01; 901/1
[58] Field of Search .................. 364/513, 191–193, 364/424.01, 436, 444, 447, 449, 460, 461, 424.02; 318/587; 901/1; 180/167–169; 340/988

[56] References Cited

U.S. PATENT DOCUMENTS

| | | | |
|---|---|---|---|
| 4,119,900 | 10/1978 | Kremnitz | 901/1 X |
| 4,168,760 | 9/1979 | Paul, Jr. | 318/587 X |
| 4,379,497 | 4/1983 | Hainsworth et al. | 318/587 X |
| 4,500,970 | 2/1985 | Daemmer | 901/1 X |
| 4,556,940 | 12/1985 | Katoo et al. | 364/444 X |

OTHER PUBLICATIONS

Marce et al.–"An Autonomous Computer-Controlled Vehicle"–Proceedings of the First International Conference on Automated Guided Vehicle Systems–Jun. 1981, Stratford-Upon-Avon, England, pp. 113-121.
Hollis–"Newt: A Mobile, Cognitive Robot"–Oct. 15, 1983–pp. 30-45.

*Primary Examiner*—Joseph Ruggiero
*Attorney, Agent, or Firm*—Koda and Androlia

[57] ABSTRACT

A locomotion-command method for a mobile robot of the type having a master section and a locomotion module wherein a travelling route is specified by a command sent from the master section to the locomotion module and wherein travelling on a given direction line is set as a basic motion, and a travelling route can be arbitrarily set by sending a command which specifies changes in the position, direction and angle of the direction line, to thereby enable a robot to freely travel with simple commands and to realize effective control of the robot.

5 Claims, 9 Drawing Sheets

LOCOMOTION-COMMAND METHOD FOR MOBILE ROBOTS

This is a continuation of application Ser. No. 091,362, filed Aug. 28, 1987 which is a continuation of Ser. No. 715,002, filed Mar. 22, 1985, now abandoned.

BACKGROUND OF THE INVENTION

This invention relates to a method for giving a locomotion-command system for mobile robots such as unmanned travelling vehicles.

There have been proposed various methods for making unmanned mobile robots travel; one method comprises the steps of emitting inductive radio waves of a predetermined frequency from an induction wire and making a mobile robot receive the radio waves to travel along the route formed by the induction wire. Another method uses an optical reflective tape and a photoelectric detector instead of the induction wire. These methods require guiding means, as the mobile robot of this type are controlled and guided by detecting and compensating deviation from the route of the induction wire or the photoelectric reflective tape which is laid on a floor. When the layout of tools and machineries and/or facilities in a plant or a warehouse are revised, the conveyor route formed among such facilities should be changed accordingly, which inconveniently needs replacing the guiding means again. Further in the case of the method using an induction wire, it takes much time and trouble in laying and burying the wire. The method using a photoelectric reflective tape has another disadvantage that it is prone to dust and easily stained or damaged.

Figure 1A:
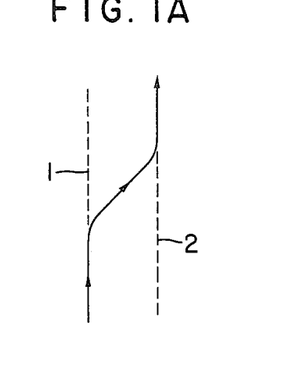
FIGS. 1A and 1B are the views to show examples of the movement of a robot.
Figure 1B:
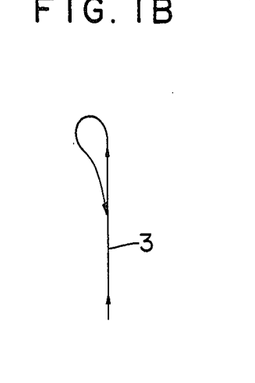

Japanese patent laid-open No. 62424/1982 discloses a travel-command method which obviates aforementioned detriments. In the method, the route along which a mobile object is to travel is expressed by a sequence of points with X-Y coordinates, which are generated in a form of digital data, with which a region is determined. The region and an assumed position ahead in the advancing direction determine a region to which the object is to advance. A steering signal is generated based upon a point on a line connecting at least two points included within the specified region and the assumed position of the moving object ahead thereof. However, as the advancing route is expressed with a sequence of points with coordinates in this method, it is not possible to smoothly specify or to control the route when the travel-lane should change from a line 1 to another parallel line 2 as shown in FIG. 1A, or when the object should make a U-turn and return on a same route 3 as shown in FIG. 1B.

SUMMARY OF THE INVENTION

An object of this invention is to provide a method for giving commands to mobile robots which enable the robot to freely travel without laying inductive wires or photoelectric reflective tapes on a floor.

Another object of this invention is to provide a method for giving locomotion-commands which enable an object to freely travel along an arbitrary route, which can easily change travelling route, and which can easily make the object make a U-turn.

Still another object of this invention is to provide a method for giving locomotion-commands which enable a mobile robot to travel freely with a simple means and which is capable of controlling communication between a master and the robot effectively.

According to this invention in one aspect thereof, for achieving objects described above, there is provided a locomotion-command method for a mobile robot of the type having a master and a locomotion module where a travelling route is specified by a command sent from the master to the locomotion module, which is characterized in that travelling on a given directed line is to be a basic motion, and a travelling route can be arbitrarily specified by sending a command which changes on the position and direction of said directed line.

According to this invention in another aspect thereof, there is provided a locomotion-command method for a mobile robot of the type moving while carrying out communication between a master and a locomotion module which is characterized in that the feedback control time during which the robot per se executes travelling control and the command execution control time during which commands from said master are executed and controlled are alternately assigned for a predetermined time.

Further, according to this invention is still another aspect thereof, there is provided a locomotion-command method for a mobile robot of the type which moves the robot while communicating between a master and a locomotion module, which is characterized in that said locomotion module has a feedback control mode by which the locomotion module control its travel by itself and a command execution control mode by which commands from said master are executed and controlled, the position and direction on the travelling line of said locomotion module are specified by using coordinate transformation as said command, the given command and said command are analysed in the execution control mode, and the travel of the robots controlled according to the result of said analysis in said feedback control mode.

The nature, principle and utility of the invention will become more apparent from the following detailed description when read in conjunction with the accompanying drawings.

DESCRIPTION OF THE PREFERRED EMBODIMENT

The principle of this invention will now be described referring to FIG. 2.

Figure 2:
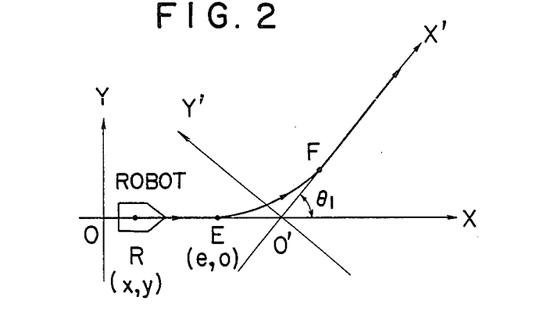
FIGS. 2 and 3 are the views to explain the principle of this invention, respectively.

In FIG. 2, a robot R (x, y) travels on a directed travel line X in the direction marked with an arrow. The mobile robot R is controlled positionwise by a servo mechanism so that it would not deviate from the line X by a large margin although it may go slightly toward the direction of Y-axis. In other words, the robot R is constantly servo-controlled to make the relation y=0. When one wishes to have the robot make a U-turn or change direction, the commanding section gives a new directed line X' and an exit point E (e, o) which starts the transient state from the line X to the line X' is specified as a transition point. With this command, the robot R is controlled to travel at a given speed until it reaches the transition point E and then to transfer to a new route X'. The travel line X is an X-axis of the XY-coordinates with a fixed original point O (0, 0). When x≧e, the robot R is controlled to enter the transient state and is transferred to a new X'Y'-coordinate having an origin O' (0, 0) from a point on the X'-axis. The point is herein referred to as F. The robot R has a position (x, y) and a direction $\theta$ in itself until the time it reaches the transient point E and constantly renews the current values with an encoder. The direction $\theta$ is an angle formed between the axis X and the mobile robot R. The direction is controlled so that a target value is set at y=0 under stationary state wherein the direction CCW is positive and posture of the robot R is set at (x, y, $\theta$). After the transient point E, the posture of the robot R is controlled on a new coordinate X'Y' as (x', y', $\theta'$).

Figure 3:
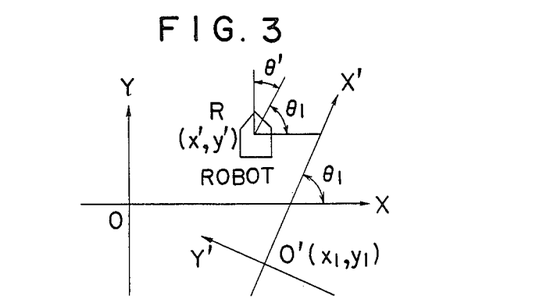

The coordinate transformation from the XY-coordinate to X'Y'-coordinate is described below referring to FIG. 3. It is assumed when a command "GO" (which will be explained hereinafter) specifies a new coordinate X'Y' to the old coordinate XY, the posture of the robot R which was (x, y, $\theta$) is (x', y', $\theta'$) in a new coordinate. The relation holds between the above two as below;

$$\begin{bmatrix} x \\ y \end{bmatrix} = \begin{bmatrix} \cos\theta_1 & -\sin\theta_1 \\ \sin\theta_1 & \cos\theta_1 \end{bmatrix} \times \begin{bmatrix} x' \\ y' \end{bmatrix} + \begin{bmatrix} x_1 \\ y_1 \end{bmatrix} \quad (1)$$
$$\theta = \theta' + \theta_1$$

From the above formula (1), the following relations are induced;

$$\begin{bmatrix} x' \\ y' \end{bmatrix} = \begin{bmatrix} \cos\theta_1 & \sin\theta_1 \\ -\sin\theta_1 & \cos\theta_1 \end{bmatrix} \times \left( \begin{bmatrix} x \\ y \end{bmatrix} - \begin{bmatrix} x_1 \\ y_1 \end{bmatrix} \right) \quad (2)$$
$$= \begin{bmatrix} \cos\theta_1 & \sin\theta_1 \\ -\sin\theta_1 & \cos\theta_1 \end{bmatrix} \begin{bmatrix} x - x_1 \\ y - y_1 \end{bmatrix}$$
$$\theta' = \theta - \theta_1$$

When the command "GO" and so on are executed, the coordinate transformation of the formula (2) or the transformation from (x, y, $\theta$) to (x', y', $\theta'$) is carried out.

Figure 4:
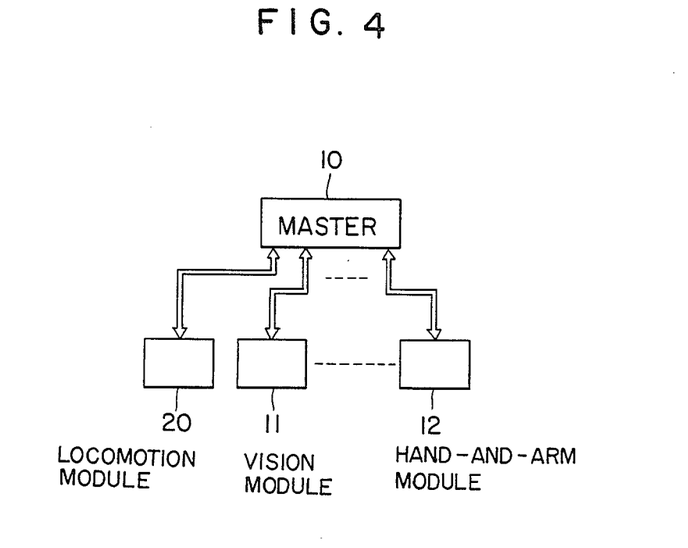
FIG. 4 is a block diagram to show the relation between a master and a locomotion module of a robot according to this invention.
Figure 5:
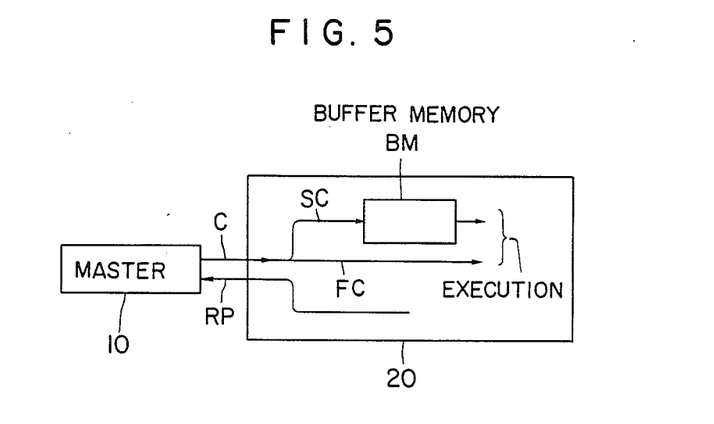
FIG. 5 is a diagram to show the communication between the master and the locomotion module.

FIG. 4 shows the relation between the master 10 and the others including the locomotion module 20 of a mobile robot. A vision module 11 provides a sensor which identifies surroundings and a hand-and-arm module 12 provides a manipulator. FIG. 5 shows that communication data comprising commands C and replies RP is exchanged between the locomotion module 20 and the master 10 at a timing described hereinafter. Commands C are transmitted from the master 10 to the locomotion module 20 in the unit of one byte. A separator such as a code or a symbol ";" is inserted between commands. Commands are classified into a slow command "SC" which is temporarily stored in a buffer memory BM and then executed sequentially in the order of arrival and a fast command "FC" which is immediately executed. Slow commands "SC" are temporarily stored in a buffer memory BM and then executed in a first-in first-out basis. Fast commands "FC" are executed immediately without being stored in a buffer memory BM. The locomotion module 20 has two states; a wait state and an active state. In the wait state, a command stored in the buffer memory BM is not executed. The state is actuated to an active state when a fast command or a "START" command (which will be described hereinafter) is transmitted from the master 10. The locomotion module 20 is in the waiting state when initialized. In the active state, the locomotion module 20 executes commands stored in a buffer memory BM in the order of arrival. Execution of each command C is completed by the time the step reaches a transient point of a subsequent command (for instance C1) where the execution of the command C1 starts. If there is no command stored in a buffer memory BM during the time a command C0 is being executed, or if the buffer memory BM is empty, the execution of the command C0 continued indefinitely. However, it is always possible to end the execution of the command C0 by transmitting such commands as "GO", "STOP 0" or "ADJUST". An active state turns into a waiting state when a command "WAIT" (described hereinafter) is executed. This command "WAIT" is a slow command which is accepted only during the active state. Replies RP are classified into "POSTURE" indicating data for the posture of the robot, "TRANSIENT" indicating that the robot has passed the transient point E but not reached the point F of the next coordinate, "STATIONARY" indicating the state is stationary, and "ERROR" indicating that an exception has taken place, that is, the state will not return to the stationary state for a long time.

An example of control algorithm is shown below for executing commands such as "GO", "SPIN", "STOP", "ADJUST", or "STOP 0". The velocity V and the angular velocity $\omega$ are servo-controlled with a program and data stored in ROM (Read Only Memory) or RAM (Random Access Memory) and by the CPU (Central Processing Unit) to follow up the target values.

When a command "GO" is given to a robot specifying the target position xd as the point to stop, the velocity is controlled at a fixed velocity mode until it becomes a predetermined state, and then at a reduced velocity mode until the X becomes a predetermined value. Then, the mode is switched to a position controlling mode, and finally to a suspension mode. In order to execute the command, a target velocity Vr(t) is given to correspond to the current position x(t) for speed reduction, and when the actual speed and the position satisfy V(t)≈0, and x(t)≈xd, the servo-loop is switched from a velocity servo-control mode to a position servo-control mode. For advancing a robot at a given speed until the target position xd and stopping the same thereon, the velocity V(x) at the point x should be;

$$V(x) = k1 \cdot \text{sign}(xd - x) \cdot \sqrt{|xd - x|} \quad (3)$$

If it is assumed that the reduction in velocity is Av, the coefficient k1 is expressed as $$k1 = \sqrt{2 \cdot Av} \quad (4)$$

When the relation expressed by the following formula (5) is obtained during the execution of a command, the mode goes into a velocity reduction mode, wherein ε is an extremely small value.

$$Vr(t) \geqq V(x(t)) - \epsilon \quad (5)$$

In the velocity reduction mode, for command controlling, the angular velocity ω is controlled by changing f(r, θ, ω) as follows;

$$f_0(r, \theta, \omega) = k2 \cdot \theta - k3 \cdot \omega \quad (6)$$

This control is continued in the position control mode. The control of the velocity V is expressed as follows:

$$Vr(t + \Delta t) = -V\text{max} \quad (7)$$

if $Vr - \Delta t \cdot g < -V\text{max}$, $$Vr(t + \Delta t) = V\text{max} \quad (8)$$

if $V\text{max} < Vr + \Delta t \cdot g$, $$Vr(t + \Delta t) = Vr(t) + \Delta t \cdot GO \times (V(t), x(t)) \quad (9)$$

if $-V\text{max} \leqq Vr + \Delta t \cdot g \leqq V\text{max}$, wherein GO is either −Av or +Av. After controlling in the velocity reduction mode, if $$\left. \begin{array}{l} |x - xd| < \epsilon' \\ V(t) < \epsilon \end{array} \right\} \quad (10)$$

are satisfied, the system goes into a position control mode. It is controlled under the position control mode so that $$Vr(t) = k4 \cdot (xd - x(t)) \quad (11)$$

When the relation below is satisfied after the positon control, it is judged that the robot has reached and stops at the target position xd.

$$\left. \begin{array}{l} x(t) \approx xd \\ V(t) \approx 0 \\ \theta \approx 0 \\ \omega \approx 0 \end{array} \right\} \quad (12)$$

The mode is called a stop mode.

Figure 6:
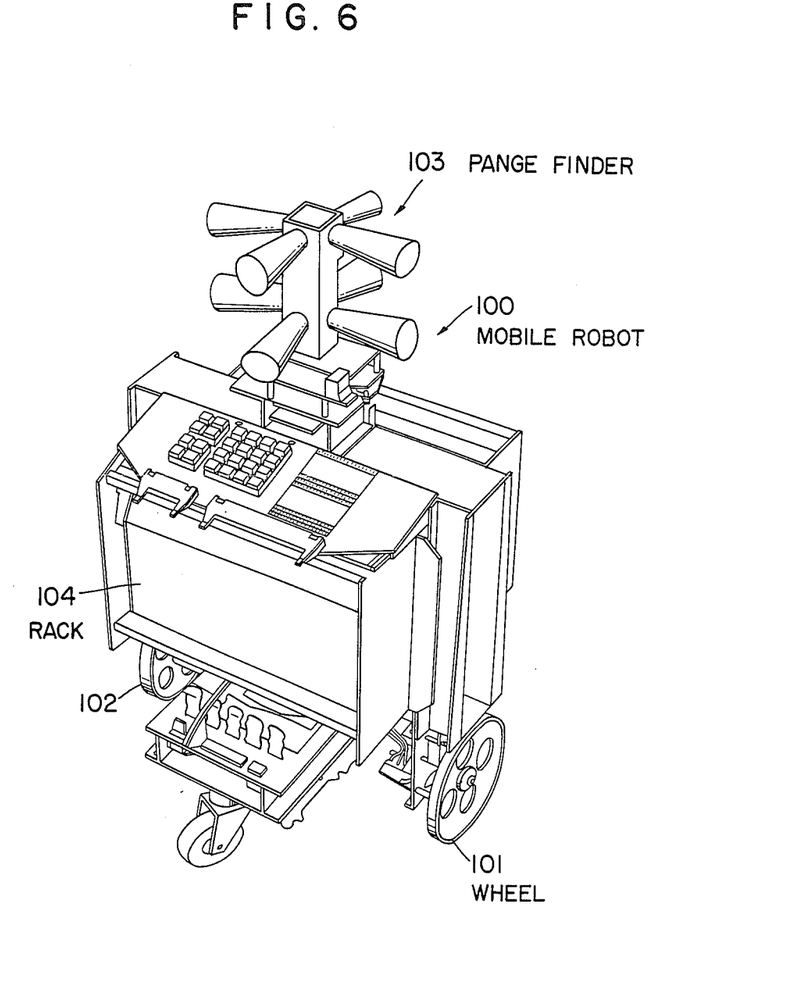
FIG. 6 shows the appearance of an embodiment of the mobile robot according to this invention.
Figure 7:
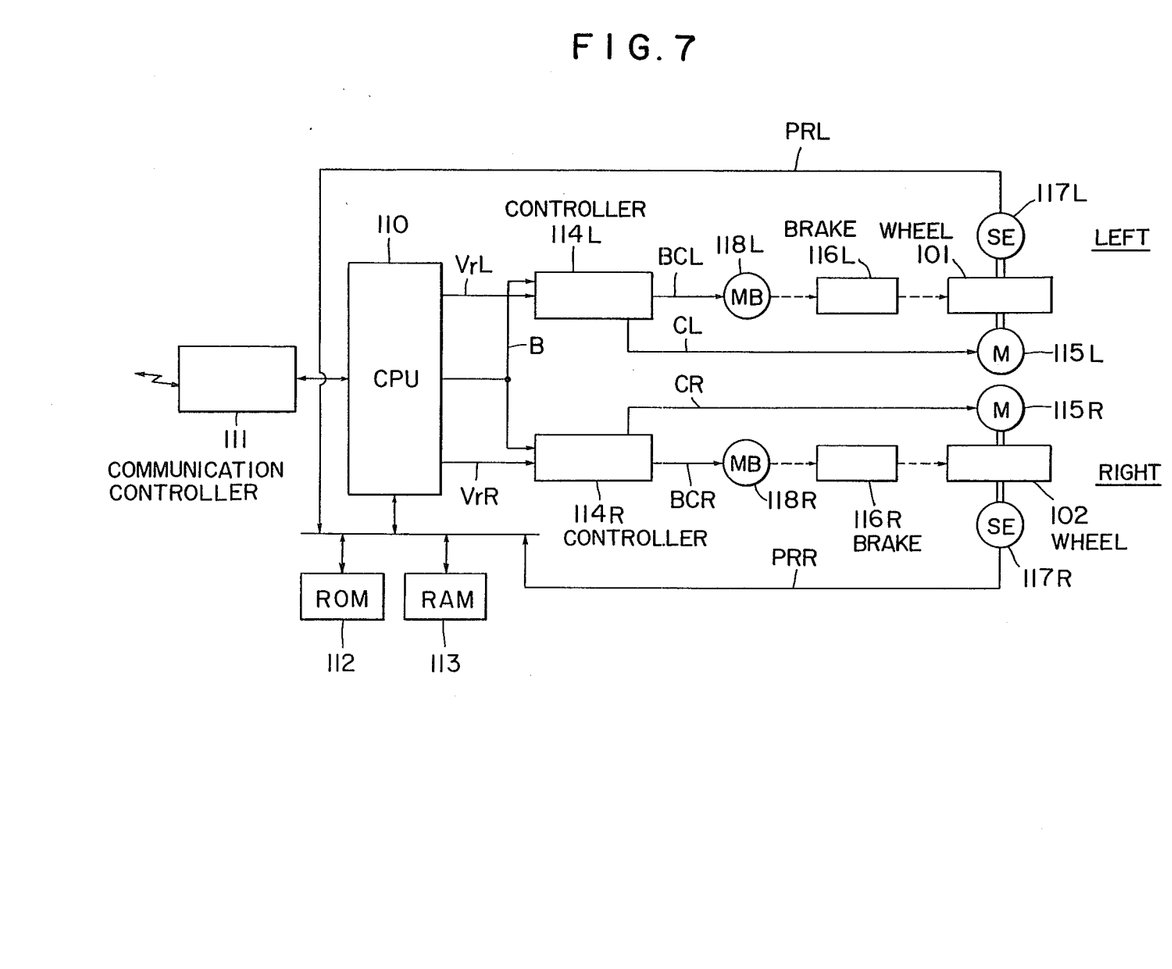
FIG. 7 is a block diagram to show an embodiment of the controlling system thereof.

FIG. 6 shows the configuration of a mobile robot of powered steering system of which this invention is applied. The bottom of the robot is provided with a pair of travelling wheels 101 and 102 having a width l therebetween while the top thereof is provided with a ultrasonic range finder 103. A locomotion module is mounted on a printed board and so on within a rack 104. The locomotion module functions to analyse commands C sent from the master 10 or drive the wheels 101 and 102 and comprises a part of the locomotion module 20. FIG. 7 shows the structure thereof in more detail. The locomotion module includes a micro-computer, CPU 110. The CPU 110 is connected a communication controller 111 to communicate with the commanding section, a ROM 112 which stores programs and parameters, and a RAM 113 which temporarily stores the data required for controlling. The CPU 110 is connected to a controller 114L which controls the driving of the left wheel 101 and a controller 114R which controls the driving of the right wheel 102. The controllers 114L and 114R control the driving of the wheels 101 and 102 via motors 115L and 115R, respectively. The wheels 101 and 102 are connected to shaft encoders 117L and 117R, respectively. The pulse outputs PRL and PRR from the shaft encoders 117L and 117R are given to the controllers 114L and 114R via the CPU 110, respectively. Brakes 116L and 116R are controlled by motors 118L and 118R which are driven with brake controlling singals B from the CPU 110.

The CPU 110 gives the target velocities VrL and VrR to the controllers 114L and 114R. Suppose the velocity of the robot 100 is V and the angular velocity is ω, then $$\left. \begin{array}{l} V = (VL + VR)/2 \\ \omega = (VR - VL)/l \end{array} \right\} \quad (13)$$

Therefore, the target velocities VL and VR are determined by the following relation may be induced from the formula (13).

$$\left. \begin{array}{l} VL = V - l/2 \cdot \omega \\ VR = V + l/2 \cdot \omega \end{array} \right\} \quad (14)$$

If the velocity V and the angular velocity ω of the robot 100 are given, the velocities VL and VR of the left and right wheels 101 and 102 are calculated according to the above formula (14) and are given to the controllers 114L and 114R as the target velocities VrL and VrR, respectively. The velocities VL and VR of the wheels 101 and 102 are measured by the shaft encoders 117L and 117R, respectively. As the outputs PRL and PRR therefrom have been given to the controllers 114L and 114R, the velocities VL and VR are controlled to ultimately coincide with the target velocities VrL and VrR, respectively.

The controlling method is described for a mobile robot of power wheeled steering type in the foregoing statement, but it may be similarly applied to those of front-wheel steering, rear-wheel driving types and others.

Figure 8:
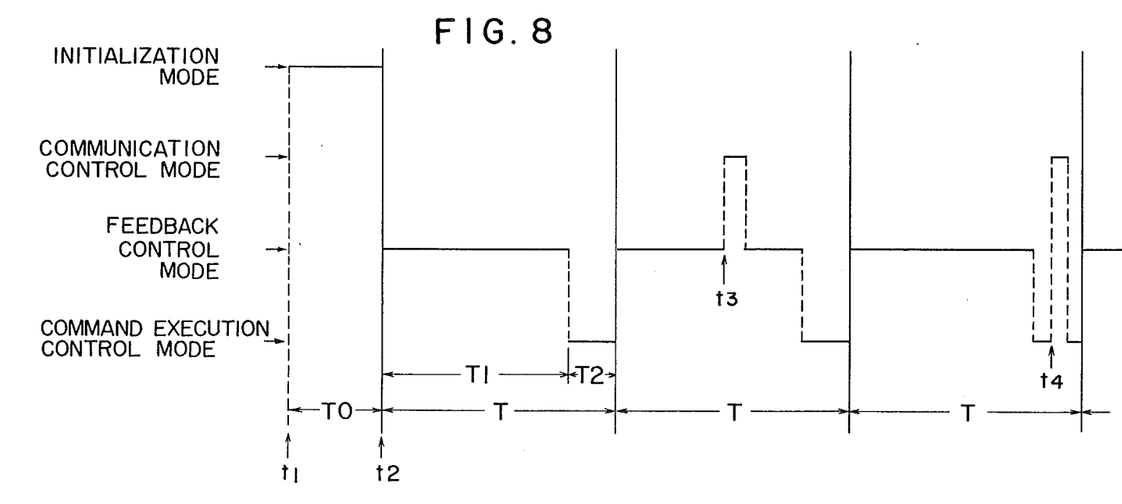
FIG. 8 is a graph to show the timing of movement thereof.

FIG. 8 shows the operation timing and operation modes of the locomotion module. The robot 100 is initialized at time t1 when the power is on, stays in the initialization mode until a predetermined amount of time T0 has elapsed, during which period the current position (x, y) is set at the point (0, 0), the angle is set as θ=0, and necessary control-parameters and the others are automatically set. After the time T0 has elapsed or after the time point t2, the feedback control mode of the time T1 and the command execution control mode of the time T2 are at the cycle T. The feedback control mode is assigned to execute the velocity control and position control which have been described in relation to the control system in FIG. 7. The command execution control mode is assinged to analyse the content of the commands received from the master via the communication controller 111 and to execute the result of this analysis. Sufficient time is assigned for all those tasks. The locomotion module sequentially repeats the feedback control mode and the command execution control mode at the cycle of the time T, but, when it receives a reply request signal of a predetermined form from the master (if a necessity arises), it immediately goes into the communication control mode so as to carry out necessary communication task within a predetermined duration of time. This communication method is advantageous compared to the one to transmit the state of the locomotion module constantly to the commanding section as the communication traffic would not be exessive. The section is returned to the original mode after a predetermined time has passed and kept in that mode. FIG. 8 shows a case where a communication request signal is sent at time t3 during the feedback control mode and another case where a communication request signal is sent at time t4 during an execution control mode. In both cases, the section immediately returned into the previous modes after the end of the communication control mode. By this arrangement, it is apparently possible to execute the travelling operation and the communication operation of the travelling section cocurrently.

Figure 9:
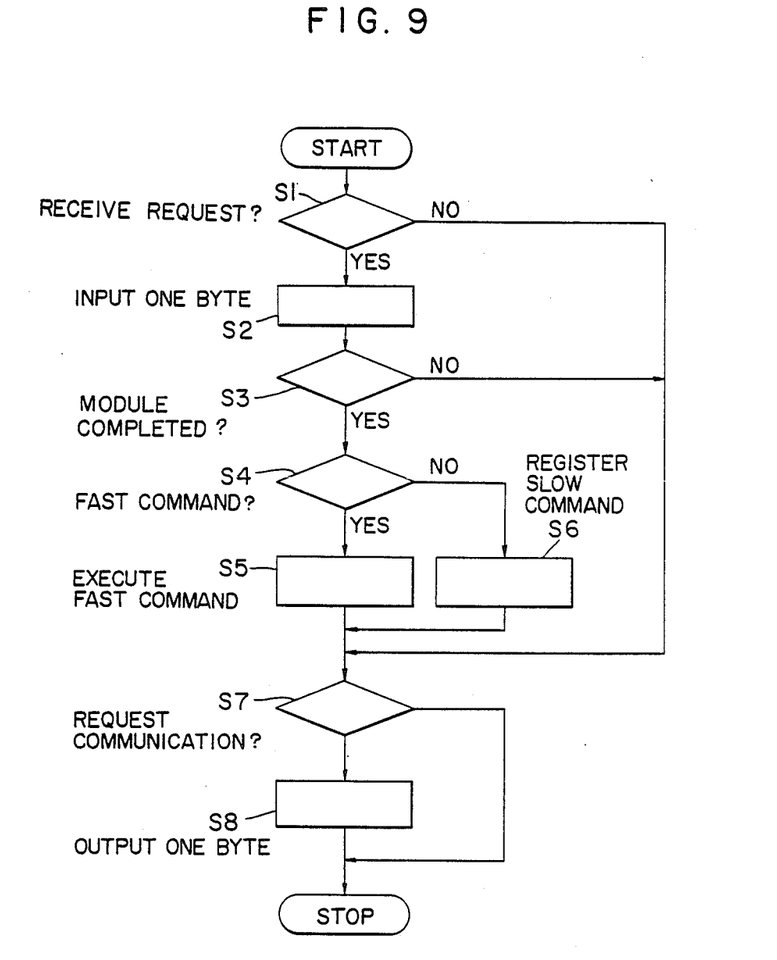
FIGS. 9 through 11 are flow charts to show respective movements of the mobile robots.

FIG. 9 is a flow chart to show the communication between the master and the locomotion module. The CPU 110 of the robot 100 is constantly testing whether a command from the master is coming or not (Step S1). If a command comes, each byte of the command is transmitted to the CPU 110 from the master via the communication controller 111 (Step S2), the step is repeated until the command data has been taken completely (Step S3). The command received is tested whether it is a fast command or not (Step S4). If it is a fast command, it is immediately executed (Step S5). If it is not a fast command, then it should be a slow command to be stored in a buffer memory BM and registered (Step S6). The CPU 110 tests whether or not the master has a request for communication (Step S7). If there is a request, data by one byte, for example the data indicating the current posture of the robot 100, it is sent to the master byte by byte to complete the job (Step S8).

Figure 10:
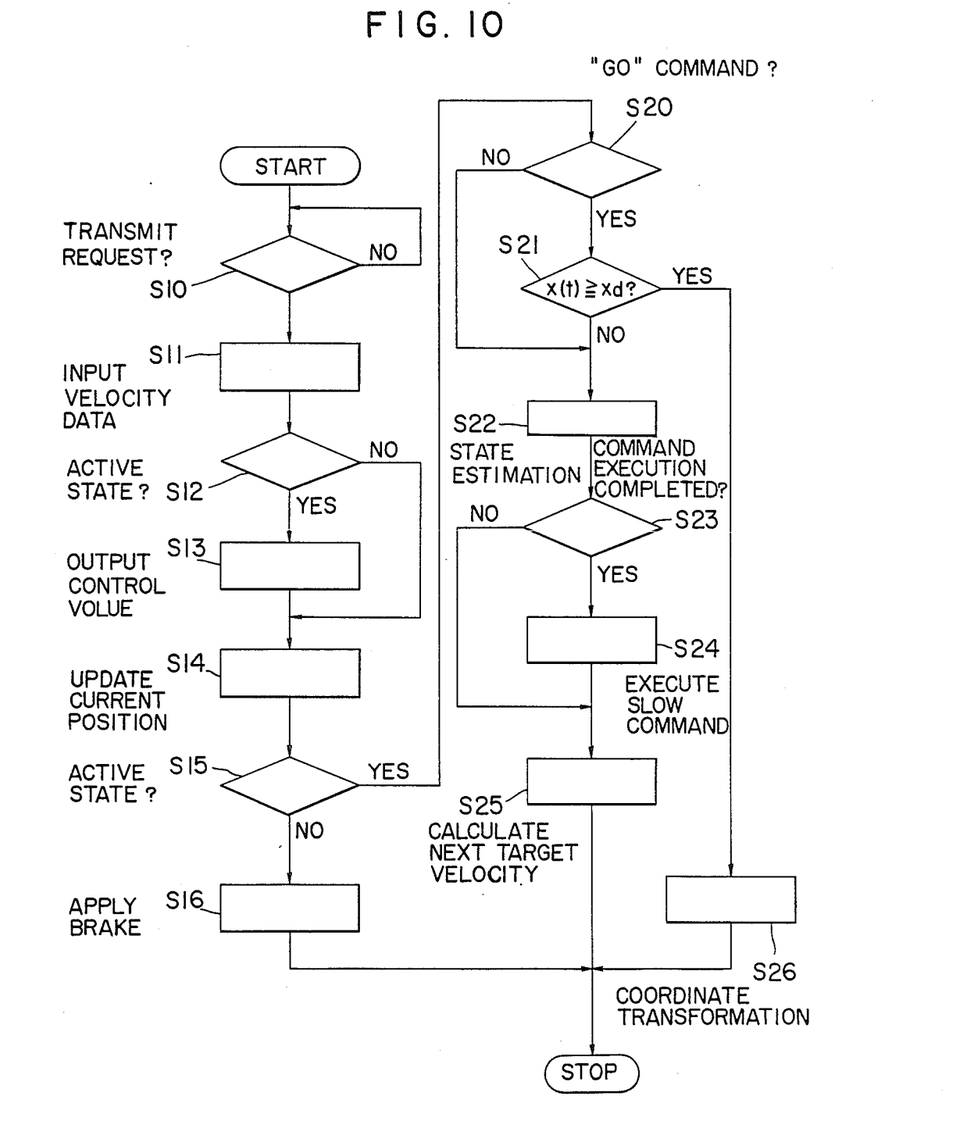

FIG. 10 shows a flow chart of the operation at the feedback control mode. The CPU 110 constantly is testing whether or not there is a data communication request from the master (Step S10), and if there is such a request, the CPU 110 reads the pulse data PRL and PRR from the pulse encoders 117L and 117R to get velocity data (Step S11). The CPU 110 then tests whether the locomotion module is in an active state or not (Step S12), and if it is in an active state, the CPU 110 sends the control value VrL and VrR which are calculated from the current position x(t), the target position xd, etc. (Step S13), and renews the current position (x(t), y(t), θ(t)) (Step S14). The CPU 110 further tests whether the locomotion module is in an active state or not (Step S15), and if it is not in an active state, the CPU 110 actuates a brake control signal BC to apply brake (Step S16). If the locomotion module is in an active state, the CPU110 judges whether it is a "GO" command or not (Step S20), and if it is a "GO" command, compares the current position x(t) with the target position xd (Step S21). If it is not a "GO" command, or even if it is a "GO" command the target position xd (for instance the point E) is larger than the current position x(t), the CPU 110 tests whether it is a transient state or a stationary state (Step S22) and tests whether the command has been completed or not (Step S23). If the command has not been completed, the CPU 110 continues to execute the command and if the command has been completed, the CPU 110 executes a slow command stored in a buffer memory BM (Step S24) and then calculates the next target velocity (Step S25). If the CPU 110 finds the current position x(t) at the Step S21, it is more than the target position xd, it carries out aforementioned coordinate transformation to complete the job (Step S26).

Figure 11:
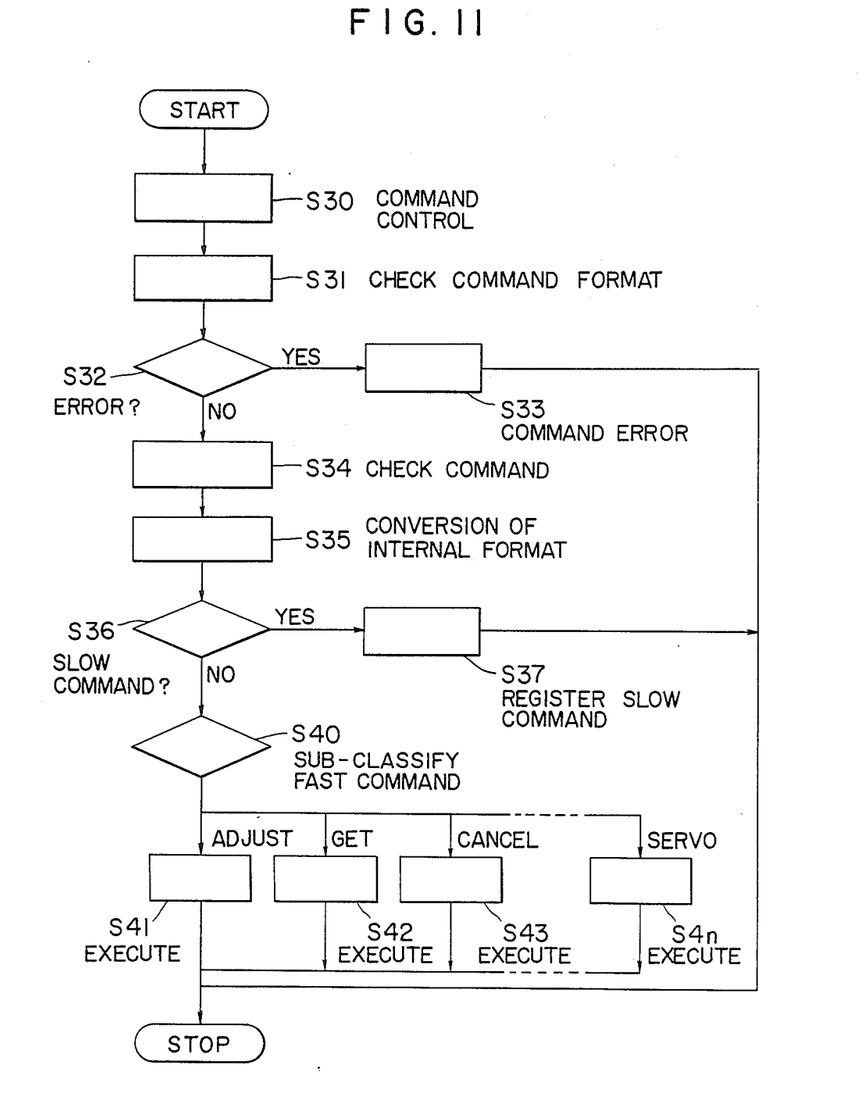

FIG. 11 is a flow chart to show an example of command execution control mode. The CPU 110, whenever step comes to a command control (Step S30), always examines the format of the command to test whether there is an error or not (Steps S31 and S32), and if there is an error, it recognizes the command as a command error (Step S33). If there is not an error, the CPU 110 checks it again (Step S34), and converts the command into the internal format suitable for execution (Step S35), and tests whether it is a slow command or not (Step S36). If it is a slow command, the CPU 110 stores the command in the buffer memory BM (Step S37), and if it is not a slow command but a fast command, the CPU 110 sub-classifies it and executes the command (Step S40).

The types and content of the commands C will now be described below.

A command C is classified as a slow command SC or a fast command FC. A slow command SC is classified as a "GO" command, a "STOP" command, "WAIT" command, a "REVERSE" command, a "VELOCITY" command, a "CONTROL" command, a "SET BRAKE" command or a "RESET BRAKE" command. A fast command FC is classified as a "GO 0" command, a "START" command, a "STOP 0" command, a "ADJUST" command, a "VELOCITY 0" command, a "GET" command, a "CANCEL" command, a "FREE MOTOR" command or a "SERVO" command. Each command is described as follows:

$$\text{"Go" command} \rightarrow \text{Ge, x, y, e;} \qquad (1)$$

A new coordinate system X'Y' is obtained by parallel-translating the current coordinate system XY and then rotating it by angle θ. The mobile robot 100 is transferred to the new X'-axis and the transient point E thereof is a point (e, 0) or the point where X=e on the old coordinate system. Effects of various "GO" commands from the locomotion module 10 on, the robot 100 is illustrated in FIGS. 12A through 12H.

Figure 12A:
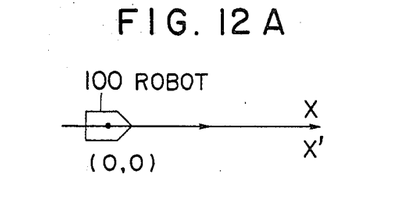
FIGS. 12A through 12H are the views to show the movement of a mobile robot with the command of "GO", respectively.
Figure 12B:
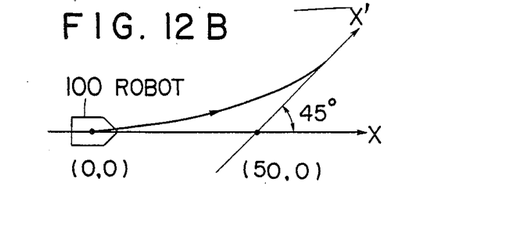
Figure 12C:
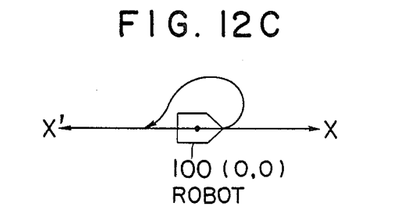
Figure 12D:
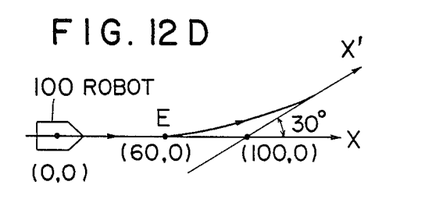
Figure 12E:
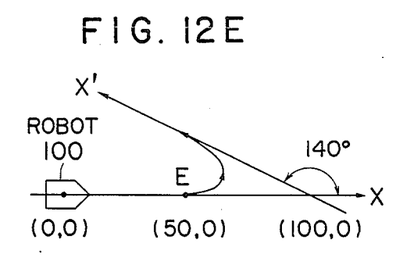
Figure 12F:
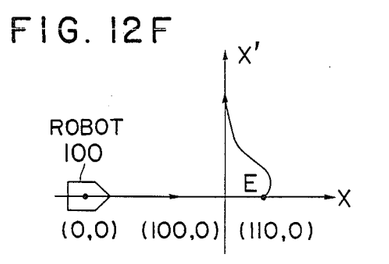
Figure 12G:
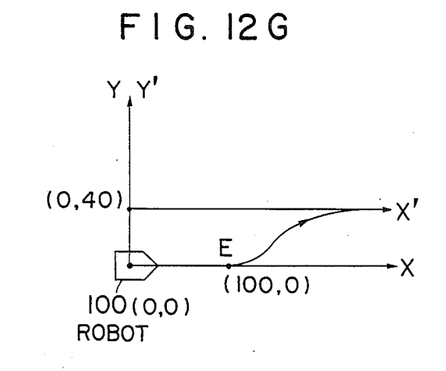
Figure 12H:
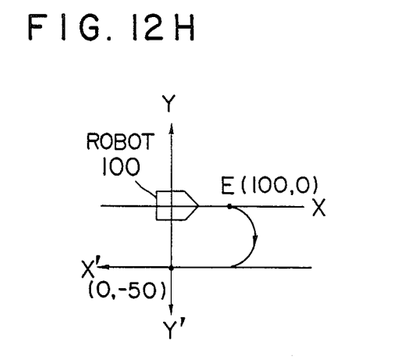

With the command "GO, 0, 0, 0;" which does include any indication for change of direction is given, the robot 100 advances on the travel line X (=X') as shown in FIG. 12A. The command "GO, 50, 0, 45;" specifies the coordinate system X'Y' having the origin at (50, 0) and the revolutional angle at 45°. The robot therefore transfers its course to the axis X' as shown in FIG. 12B. As the command "GO, 0, 0, 180;" means the change of direction at the origin (0, 0), the robot 100 travels in the opposite direction as shown in FIG. 12C. If the robot 100 receives a "GO" command while travelling, it will make a turn as follows. As the command "G60, 100, 0, 30;" has the origin at (100, 0) on the new coordinate system X'Y', the inclination at 30° and the transient point E at (60, 0), the robot 100 follows the route indicated in FIG. 12D. FIG. 12E illustrates the movement of the robot 100 when the command is for the transient point E at (50, 0) and the inclination angle θ at 140°. As the command "G110, 100, 0, 90;" indicates a transfer at the position E (110, 0) past the new origin (100, 0), the robot 100 moves as shown in FIG. 12F at the rotational angle θ=90°. When the command "G100, 0, 40, 0;" is received, the robot 100 will move to a new X'-axis from the transient point E (100, 0) following the route as shown in FIG. 12G and when a U-turn command "G100, 0, −50, 180;" is received, the robot 100 will move as shown in FIG. 12H.

"SPIN" command→Nθ;  (2)

This command is effective only when the robot 100 is in a stop state. Otherwise, the command in ignored. It makes the robot spin by the angle θ and stop after execution of the command. No coordinated transformation is carried out by this command.

"STOP" command→Ps;  (3)

This command makes the robot 100 stop at a point (s, 0) on the X-axis. If the robot has already passed the point, it recedes to the alone point (s, 0) and stops thereon. The command is ignored while the robot 100 is in a stop state.

"WAIT" command→W;  (4)

This command makes the robot 100 enter into a waiting state.

"REVERSE" command→Re;  (5)

With this command, the robot 100 reverses the direction of travelling but no change occurs on the route per se before and after the "reverse" command.

"VELOCITY" command→Vv;  (6)

This command changes the travelling velocity at the stationary state to determine the velocity of "GO" and "SPIN" commands which might appear later "CONTROL" command→Cp1, p2;  (7)

This is a slow command to change control parameters by a servo-loop in order to change the route or required time of the travel of the robot 100 at the transient state C1 denotes the type of a parameter and C2 its value.

"SET BRAKE" command→B;  (8)

This is the command to apply the brakes 116L and 116R of the robot 100.

"RESET BRAKE" command→K;  (9)

This command releases the brakes previously applied on the robot 100.

"START" command→S;  (10)

This is the command to make the robot 100 start travelling by changing the state from waiting to active.

"STOP 0" command→Q;  (11)

This is the command to stop the robot 100 in emergency. Unlike the "Stop" command, it does not specify any "s".

"ADJUST" command→Ax, y, θ;  (12)

This command is similar to the aforementioned "GO" command in transferring onto a new coordinate system. This command is used wihle a "GO" command is being executed, in order to revise the position of the origin or minutely modify the route. This therefore does not specify the transient point E.

"VELOCITY 0" command→Uv;  (13)

This command changes the velocity of the robot 100 while another command is being executed.

"GET" command→T;  (14)

This command requests the robot to send back data of the current state. Responding to this command, the robot 100 sends a reply RP.

"CANCEL" command→L;  (15)

This is the command to cancel all slow commands SC stored in a buffer memory BM in order not to execute it.

"FREE MOTOR" command→F;  (16)

This is the command for moving the robot 100 manually.

"SERVO" command→E;  (17)

This is the command for moving the robot 100 with the servo mechanism.

Figure 13:
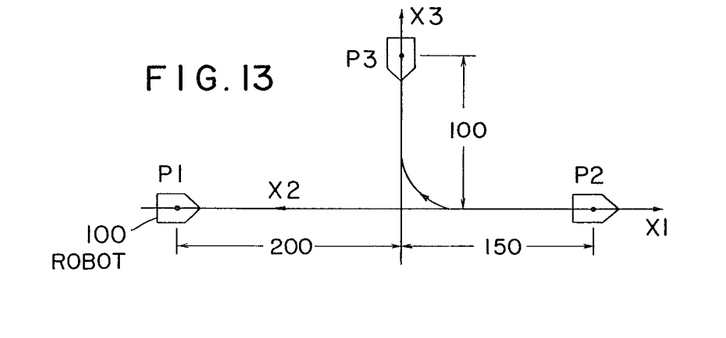
FIG. 13 is a view to show the state of travel of a mobile robot.

A command sequence shown in FIG. 13 makes the robot 100 in a stop state at the position P1 advance to the position P2, and recede to the position P3. With the last "START" command S, the robot 100 starts travelling.

As is described in the foregoing statements, this invention enables to travel a robot freely with simple commands to realize thereby effective control of the robot. As the travelling section of this invention is separately provided, the similar advantage can be obtained even if commands are sent by radio or similar means.

It should be understood that many modifications and adaptations of this invention will become apparent to those skilled in the art it is intended to encompass such obvious modifications and chages in the scope of the claims appended hereto.

What is claimed is:

1. A control method for the travel motion of a mobile robot across an area definable by Cartesian coordinates along a traveling route using a main control module sending out coordinate related control commands as well as a locomotion module moving together with the robot and responding to the control commands and self-controlling the local direction of movement of the robot, characterized by the steps of:

self-controlling of robot by the locomotion module such that said robot follows a given straight line;

sending a change of course from the main control module to the locomotion module, said change of course command comprising data indicative of a location at which a change of course is to occur and data indicative of an angle between the given straight line and a new direction of travel;

executing the change of course command by the locomotion module when the mobile robot reaches the location at which said change of course is to occur; and self-controlling the mobile robot by the locomotion module such that said robot follows a straight line along said angle in said new direction of travel.

2. A control method according to claim 1, further characterized by the steps of only sending position and direction data of the robot from the locomotion module to the main control module upon a request command from the main control module.

3. A control method according to claims 1 or 2, further characterized by the steps of classifying the control commands sent from the main control module by the locomotion module into fast commands to be executed immediately and into slow commands to be temporarily stored in a buffer memory.

4. A control method according to claim 2 further characterized in that the request command for sending position and direction date to the main control module is received during only a part of the time the robot is being self-controlling or is receiving control commands from the main control module.

5. A control method according to claim 4 further characterized by the steps of determining by the locomotion module the position and direction data for the robot from ultrasonic distance measuring equipment moving together with the mobile robot.

* * * * *